No. 769,267. PATENTED SEPT. 6, 1904.
W. J. MUNCASTER.
MEASURING INSTRUMENT.
APPLICATION FILED FEB. 23, 1904.
NO MODEL. 2 SHEETS—SHEET 2.
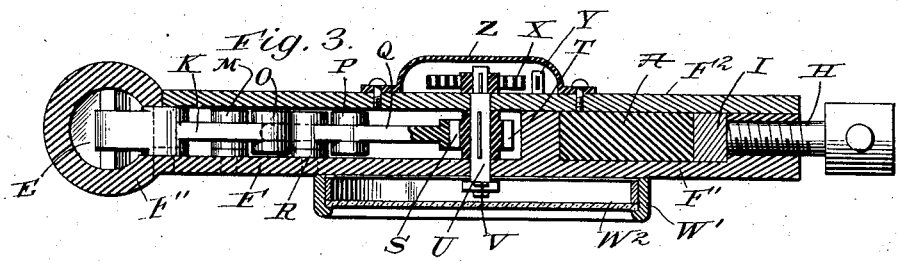
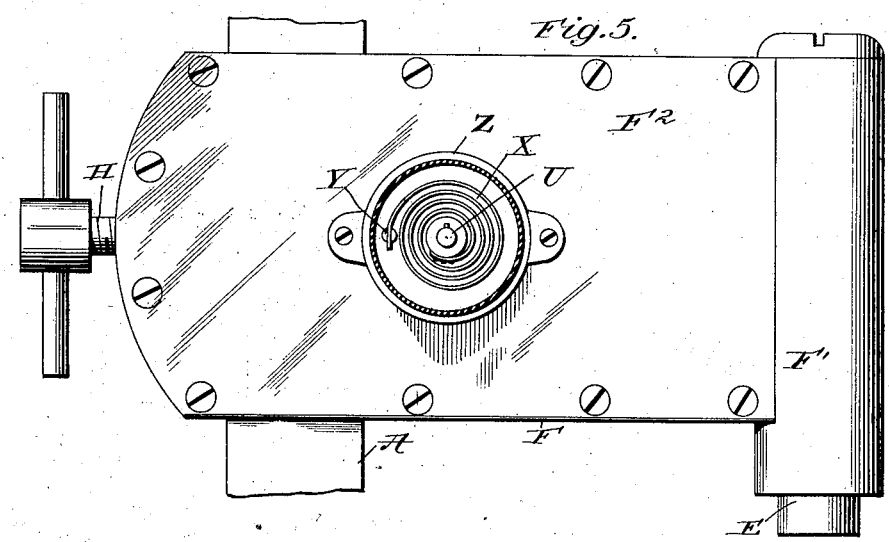
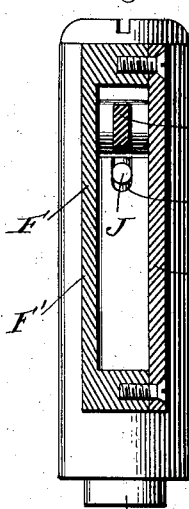
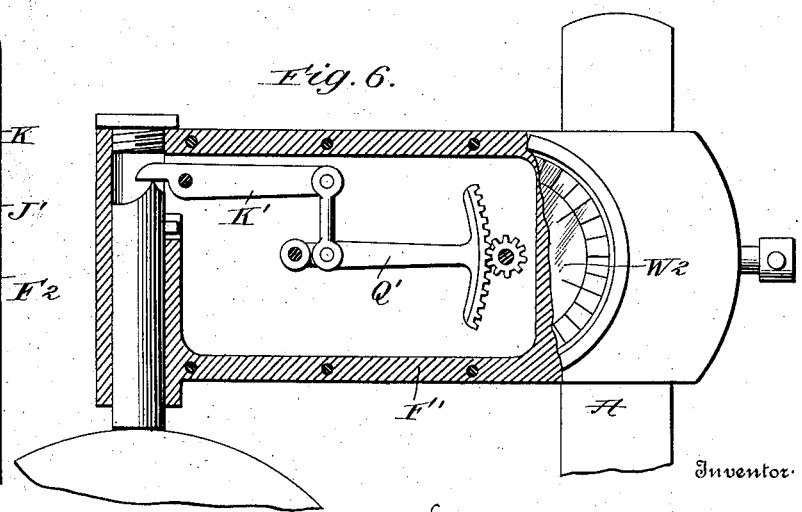
Witnesses
Inventor
Walter J. Muncaster,
By Dodge and Sons,
Attorneys No. 769,267.  
Patented September 6, 1904.

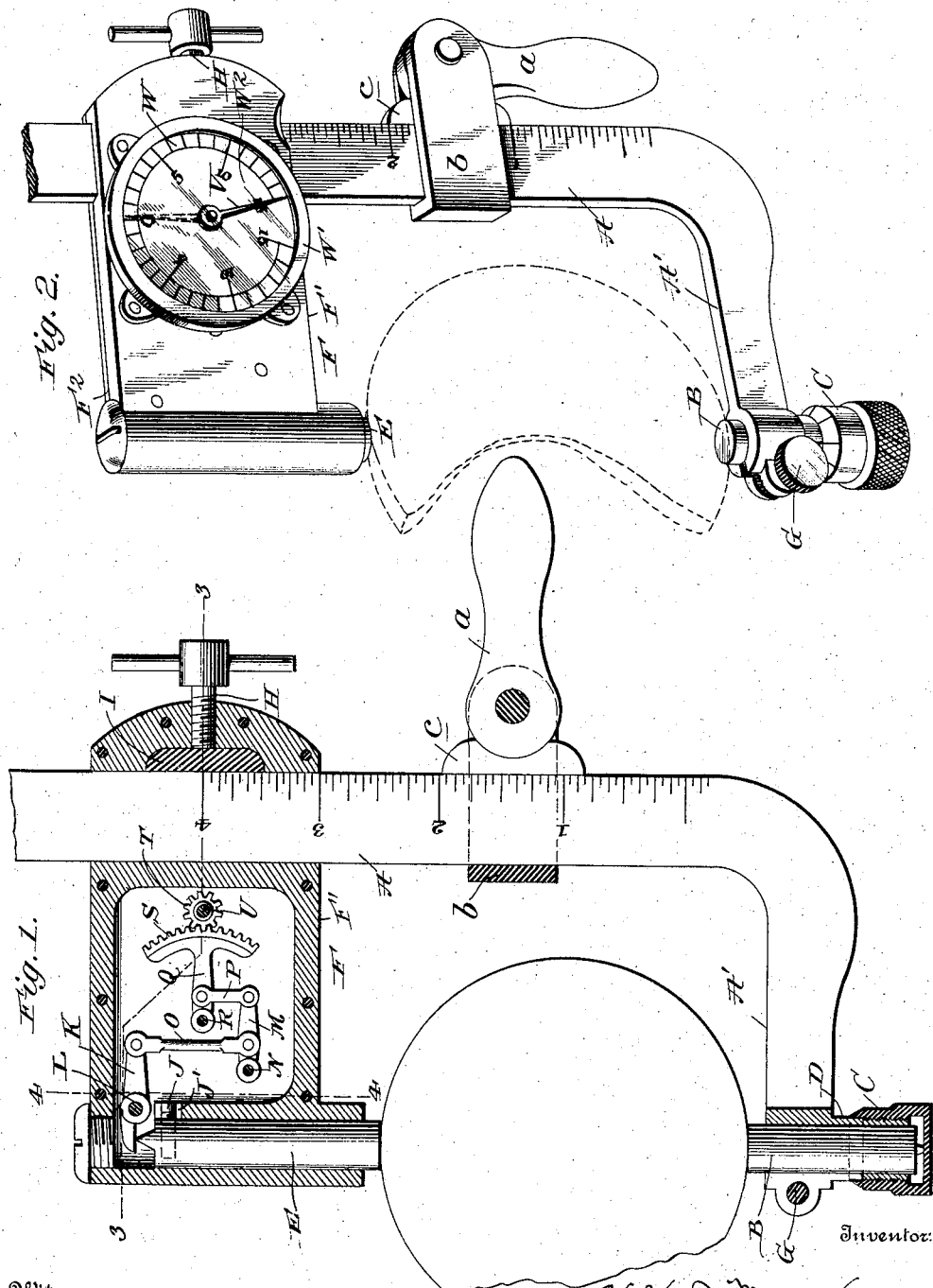

UNITED STATES PATENT OFFICE.

WALTER J. MUNCASTER, OF CUMBERLAND, MARYLAND, ASSIGNOR OF ONE-HALF TO CUMBERLAND STEEL COMPANY, OF CUMBERLAND, MARYLAND, A CORPORATION OF MARYLAND.

MEASURING INSTRUMENT.

SPECIFICATION forming part of Letters Patent No. 769,267, dated September 6, 1904.

Application filed February 23, 1904. Serial No. 194,893. (No model.)

*To all whom it may concern:*

Be it known that I, WALTER J. MUNCASTER, a citizen of the United States, residing at Cumberland, in the county of Allegany and State of Maryland, have invented certain new and useful Improvements in Measuring Instruments, of which the following is a specification.

My present invention pertains to improvements in measuring instruments, and more particularly to micrometer-calipers, the construction and advantages of which will be hereinafter set forth, reference being had to the annexed drawings, wherein—

Figure 1 is a longitudinal sectional view of the device, a gage of exactly three inches diameter being shown between the measuring-points; Fig. 2, a perspective view of the device; Fig. 3, a transverse sectional view, on an enlarged scale, of the adjustable head, taken on the line 3 3 of Fig. 1; Fig. 4, a vertical sectional view on the line 4 4 of Fig. 1 on the same scale; Fig. 5, a rear elevation of the head, the protecting cap or cover for the spring being broken away on the scale shown in Figs. 3 and 4; and Fig. 6 a sectional view showing a slightly-modified form or arrangement of the multiplying-leverage system.

The object of my invention is to produce a simple and efficient micrometer-caliper, one which will readily and accurately measure to a small fraction of an inch the work in hand and visually indicate such measurement, showing whether the work be above or below the standard or fixed size.

Referring first to Figs. 1 to 5, inclusive, A denotes the beam, the body portion thereof being graduated in inches, (or any other desired scale,) as shown. The end of the outwardly-projecting arm A' of the beam is split, and a plug or bearing member B is mounted therein, said plug being moved vertically by a threaded sleeve C, which works upon an externally-threaded extension D of the arm A'. The threads formed upon the parts will of course be of standard size, so that a rotation of the sleeve C will project or permit the plug to be depressed a determinate distance. If the threads be thirty-two per inch, a full rotation would move the plug one thirty-second of an inch and a half-turn one sixty-fourth of an inch. The function of this plug is primarily to bring the indicator or pointer to the zero or medial point on the scale when a gage is placed between said plug and a plunger or cylindrical member E, movably mounted in the head F. The plug B may also be adjusted to increase or diminish the distance between it and plunger E when it is desired to calibrate work slightly above or below the size of the gage by which the caliper is initially adjusted—as, for instance, one thirty-second or one sixty-fourth of an inch over or under three inches, to which the caliper is adjusted by a gage of that size. A binding-screw G is employed to clamp the plug B in its adjusted position.

Head F, comprising a main body portion F' and a detachable cover-plate F², is slidably mounted on beam A, being held in its adjusted position thereon by a screw H and a bearing-block I. The graduations on the beam facilitate the ready adjustment of the head and enable the user to bring it, and consequently the plug, to an approximate adjustment. Plunger E is accurately fitted in the outer end or enlarged portion of head F, a screw or pin J, which extends laterally therefrom and works in a slot J', formed in the adjacent wall, serving to limit the outward movement of the plunger. The upper end of the plunger is formed with a knife-edge bearing, which works against the under face of a lever K, fulcrumed at L. A second lever M, fulcrumed at N, is connected to the opposite end of lever K through a link O. Lever M in turn is connected, through a link P, to a third lever Q, fulcrumed at R, said lever Q carrying a sector-rack S at its free or outer end, which meshes with a pinion T. Said pinion is secured to a shaft U, which carries a pointer or hand V, working over a scale W. The scale and hand will be protected by any suitable casing—as, for instance, by a ring-shaped member W', secured to the head, and a cover W² of glass. A spring X, secured to the opposite end of shaft U and to the head F through post or stem Y, tends to rotate said shaft and hand V clockwise and to normally hold the hand in the position indicated in Fig. 2, in which position plunger E will be fully protruded. A cap or cover Z is provided for the spring.

As will be noted upon reference to Fig. 2, the scale W is provided with a central zero-mark, said scale being graduated equally upon each side thereof to "15," the graduations upon the right designating minus measurements or the thousandths of an inch below the standard gage, while those on the left indicate plus measurements or the thousandths above gage. When a gage is placed between the plug B and plunger E and plug B is properly adjusted—say to three inches, as in Fig. 1—hand V will be brought to the zero-mark. Any variations in the work subsequently calibrated, either above or below the standard, will be quickly and accurately indicated visually by the hand working over the scale or disk W.

The leverage system shown in Fig. 1 causes a movement of one one-thousandth of an inch of the plunger to give more than an eighth of an inch movement to the point of the hand. Lever K is shown in the proportion of one to two; lever M, one to three; lever Q, one to four; and the pinion to the hand-point, one to five, making a total of one hundred and twenty to one. On account of lack of space this compounding is necessary and likewise renders the instrument more sensitive.

A handle $a$ is pivoted in a strap $b$, which is passed about the beam, the eccentric portion of the handle bearing on a block $c$, which in turn bears against the edge of the beam. By turning the handle down to the position shown in Fig. 2 it may be readily shifted along the beam when the head is to be adjusted or for any other reason and as quickly clamped again.

In Fig. 6 a slight modification of the leverage system is illustrated, the intermediate lever being omitted and the proportions correspondingly varied to compensate therefor. These relatively long levers K' and Q' may be employed on large instruments.

From the foregoing description it will be seen that when the caliper is once adjusted by a standard gage or to a given measurement work may be calibrated therewith without further adjustment, the caliper showing the size of the work in hand, whether it be above or below the required measurement. No adjustment of the plug B is necessary after the instrument has been set. It will likewise be noted that the instrument has a large range of measurement by reason of the adjustability of the head upon the beam. When the head has been approximately adjusted—as, for instance, to the position shown in Fig. 1—for a measurement of three inches, a relatively small movement or adjustment of the beam B will suffice to bring the pointer to the intermediate position upon the scale, which denotes zero.

This invention is to be clearly distinguished from micrometer-gages in which the adjustment of a screw is necessary each time a measurement or reading is to be made.

Having thus described my invention, what I claim is—

1. In a measuring instrument, the combination of a beam; an adjustable plug or bearing member carried by an extension of said beam; a head adjustably mounted upon the beam; a plunger slidably mounted in said head and movable toward and from the plug; a scale carried by the head; a rotatable pointer working over said scale, said pointer standing normally midway between the extremities of the scale when the plunger and plug are adjusted to a given gage; a multiplying-lever system intermediate said plunger and the pointer for rotating the latter in one direction in unison with the inward travel of the plunger; and a spring serving to rotate the pointer in the opposite direction and to normally protrude the plunger, substantially as described.

2. In a measuring instrument, the combination of a beam; a plug carried at the outer end of an extension of said beam; means for adjusting said plug; a head adjustably mounted upon said beam; a plunger slidably mounted in said head and movable toward and from the plug; a scale carried by the head; a shaft rotatably mounted in the head; a pointer carried by said shaft and movable over said scale, the pointer standing normally at the mid-length of the scale when the plug and plunger are separated a determinate distance; a protecting casing or cover over said scale and pointer; a multiplying-lever system intermediate the plunger and the pointer-shaft, whereby a slight movement of the plunger will cause a relatively great movement of the pointer; a spring connected to the head and the shaft and acting through the shaft upon said lever system and tending normally to protrude the plunger and rotate the pointer to one extremity of the scale; and a cover for the spring.

3. In a measuring instrument, the combination of a beam provided with an outwardly-extending portion A'; a plug mounted therein; means for securing endwise movement of the plug; means for holding said plug in its adjusted position; a head slidably mounted upon the beam; means for securing said head in its adjusted position; a plunger mounted in the head in line with the plug; a scale mounted upon the head; a shaft U carried by the head; a pointer carried by said shaft and working over the scale; a spring connected to the shaft and to the head and serving to rotate the shaft in one direction; a pinion mounted upon the shaft; a sector-gear meshing with said pinion, said gear being carried by the outer or free end of a lever fulcrumed in the head; and a lever connection intermediate said lever and the inner end of the plunger, substantially as described.

In testimony whereof I have signed my name to this specification in the presence of two subscribing witnesses.

WALTER J. MUNCASTER.

Witnesses:
ALBERT CHARLES,
ROBERT S. SHRIVER.